United States Patent [19] [11] 4,138,170
Markfelder et al. [45] Feb. 6, 1979

[54] CAGELESS BALL OR ROLLER BEARING

[75] Inventors: Günter Markfelder; Heinrich Hofmann, both of Schweinfurt, Fed. Rep. of Germany

[73] Assignee: Kugelfischer Georg Schäfer & Co., Schweinfurt, Fed. Rep. of Germany

[21] Appl. No.: 850,804

[22] Filed: Nov. 11, 1977

[30] Foreign Application Priority Data

Nov. 13, 1976 [DE] Fed. Rep. of Germany ....... 2651827

[51] Int. Cl.² .............................................. F16C 19/00
[52] U.S. Cl. .................................... 308/195; 308/199; 308/206; 308/213; 308/214; 308/218
[58] Field of Search .................................. 308/193-198, 308/199-200, 201, 188, 189 R, 202, 206, 207 R, 209, 212-214, 216, 217-218, 236, 235

[56] References Cited

U.S. PATENT DOCUMENTS 1,941,460 1/1934 Boden .............................. 308/218 X
3,975,066 8/1976 Hofmann et al. ..................... 308/201

FOREIGN PATENT DOCUMENTS 792931 4/1958 United Kingdom ..................... 308/218

Primary Examiner—Trygve M. Blix
Assistant Examiner—Douglas C. Butler
Attorney, Agent, or Firm—Karl F. Ross

[57] ABSTRACT

An annular array of rotary bodies (balls or rollers) separates two coaxial track surfaces of a pair of bearing rings from each other, one of these track surfaces forming an annular lodgment for these bodies while the other track surface is unobstructed on at least one side of the array to facilitate the initial assembly of the bearing rings and the bodies into a unit. At least one retaining element embraces one of the rotary bodies and has a flange resiliently snap-fitted into an annular V-groove of the unobstructed track surface, the flange having an undercut enhancing its radial compressibility to facilitate such engagement; this holds the unit together during transportation and handling.

8 Claims, 7 Drawing Figures

CAGELESS BALL OR ROLLER BEARING

FIELD OF THE INVENTION

Our present invention relates to a journal bearing wherein a pair of coaxial rings, forming confronting track surfaces, are separated by an annular array of rotary bodies (i.e., balls or rollers) which are not interconnected by a common cage.

BACKGROUND OF THE INVENTION

In such cageless bearings, at least one of the track surfaces generally has shoulders or recesses serving to guide the rotary bodies and to prevent lateral excursions thereof. To facilitate the assembly of the rings and the balls or rollers, however, one track surface is unobstructed on at least one side of the array. In use, alignment of the rings is usually insured by their mountings on a shaft and a housing, for example; prior to its emplacement in the machine for which it is intended, however, the assembly must be held together by other means.

Thus, German published specification No. 2,155,290 shows a cageless roller bearing provided with retaining rings for this purpose. Such retaining rings, conforming e.g. to German standards DIN 421 and 422, are relatively cheap to produce and easy to mount in the case of small bearings. With larger assemblies, however, their costs rise considerably and substantial force is required for installing them. The price factor is particularly significant with odd-size bearings for which mass production is out of the question.

Bearings equipped with cages for their balls or rollers have heretofore been provided with grooves in their track surfaces engageable by extensions of these cages. See, in this connection, German Pat. No. 1,056,881 as well as our copending application Ser. No. 850,804, filed on Oct. 27, 1977, disclosing an improved construction of that type.

There are many instances, again particularly in the case of larger bearings, where the use of a roller or ball cage would be prohibitively expensive; such cages are also undesirable in cases where large loads are to be supported, calling for the emplacement of as many balls or rollers as possible in the annular gap between the two track surfaces.

OBJECTS OF THE INVENTION

The general object of our present invention, therefore, is to provide an improved bearing unit whose components are held together by simple retaining means during transportation and handling.

A more particular object is to provide a unit of this character in which the retaining means can remain in place after installation of the unit at its point of use, without interfering with the operation of the bearing or increasing its overall dimensions.

SUMMARY OF THE INVENTION

We realize these objects, in accordance with our present invention, by providing holding means including one or more retaining elements each embracing a single rotary body of an array guided by an annular lodgment on one of the track surfaces, the unilaterally or bilaterally unobstructed other track surface and the retaining element or elements being provided with interfitting formations whereby the two rings are held in a substantially fixed relatively axial position.

In accordance with a more particular feature of our invention, a flange on a retaining element is snap-fitted into a V-groove of the unobstructed track surface, the flange having a generally triangular profile complementary to that of the groove. To enhance its radial compressibility for the purpose of facilitating its introduction into the V-groove, we prefer to provide the flange with an undercut or lateral incision of a shape disclosed in our above-identified copending application.

The use of a single retaining element, or a small number of such elements compared with the number of rotary bodies, enables us to utilize a larger number of such bodies as compared with conventional cage bearings of the same size. In cases where a certain spacing of the balls or rollers can be tolerated, each rotary body may be individually embraced by its own retaining element with resulting further stabilization of the assembly.

BRIEF DESCRIPTION OF THE DRAWING

The above and other features of the invention will now be described in detail with reference to the accompanying drawing in which.

SPECIFIC DESCRIPTION

Figure 1:
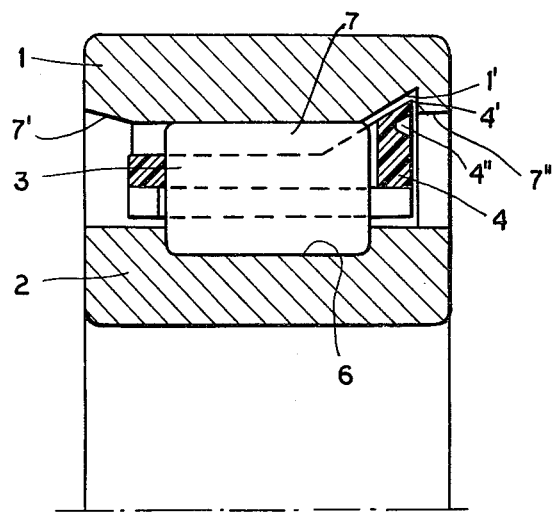
FIG. 1 is a cross-sectional view of a representative portion of a roller-bearing unit embodying our invention.
Figure 2:
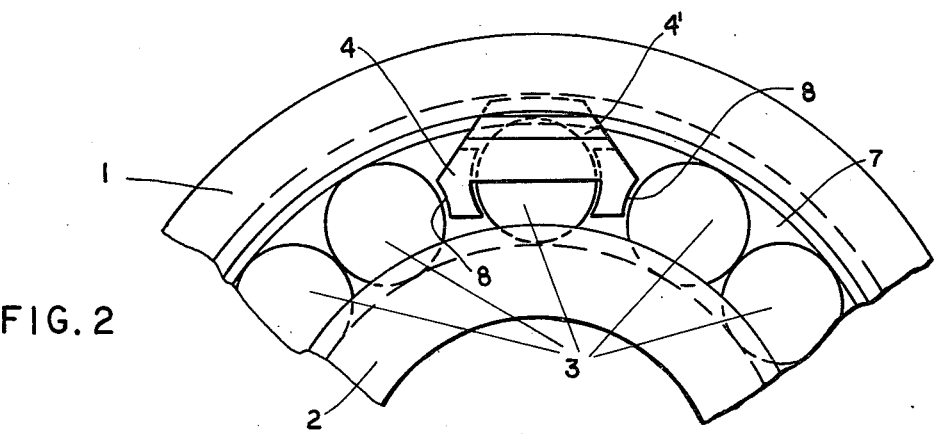
FIG. 2 is a face view of the assembly shown in FIG. 1.

The bearing unit shown in FIGS. 1 and 2 comprises an outer ring 1 and an inner ring 2 coaxial with each other, ring 2 having a flat peripheral groove 6 accommodating a multiplicity of rollers 3. A confronting track surface 7 of ring 1 is unobstructed, i.e., free from shoulders or other projections, on both sides of groove 6 and has a beveled face 7' along one of its lateral edges. The opposite side of track surface 7 is formed with an annular V-groove 1' whose outer boundary is a ledge or end zone 7" of a radius greater than that of the central portion of surface 7.

One of the rollers 3 is embraced by an elastic retaining element 4, e.g. of resinous material, provided with a flange 4' of triangular profile substantially complementary to that of V-groove 1'. The exposed face of element 4 has an undercut 4", also of substantially triangular profile, which facilitates the radial compression of the flange to an extent sufficient to clear the ledge 7" upon introduction of inner ring 2 with its rollers 3 into outer ring 1 from the side of that ledge. Once the flange 4' snaps into the groove 1', the rings 1 and 2 can no longer be separated since the smaller radius of the central portion of track surface 7 does not permit an extraction toward the opposite side of ring 1 (i.e., to the left as viewed in FIG. 1) even with full compression of flange 4'.

With only a single retaining element 4 employed, all the other rollers 3 are in close contact with one another throughout the array.

Figure 3:
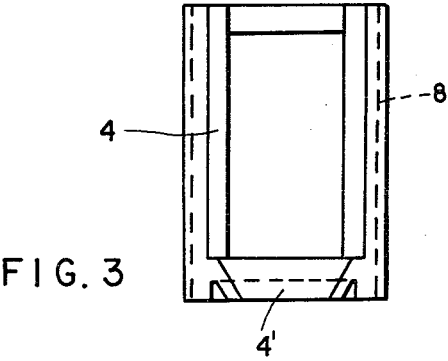
FIG. 3 is a top view of a retaining element used in the assembly of FIGS. 1 and 2.

The retaining element 4, seen from the top in FIG. 3, has curved outer flanks 8 conforming to the contours of the adjoining rollers 3 in contact therewith for additional guidance.

Figure 4:
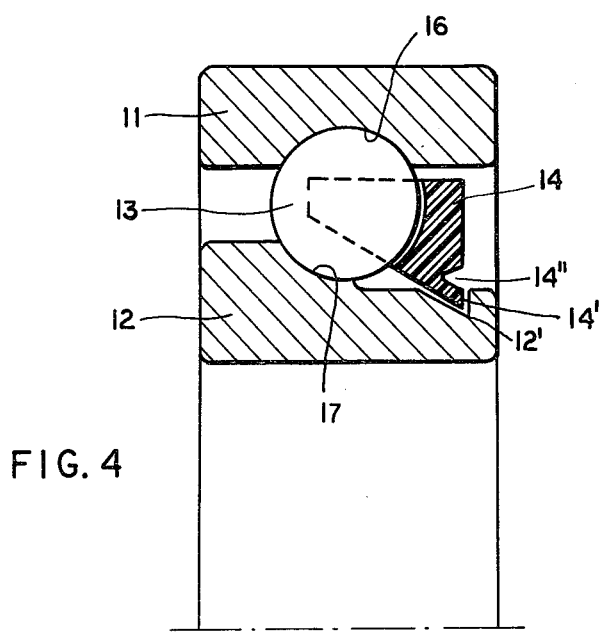
FIG. 4 is a view similar to FIG. 1, illustrating a ball-bearing unit of unsymmetrical type.

The bearing unit shown in FIG. 4 has outer and inner rings 11 and 12 separated by balls 13 which are laterally guided by an annular groove 16 in the track surface of ring 11 and by a curved annular shoulder 17 on the track surface of ring 12; the side of the latter track surface opposite shoulder 17 is again unobstructed and formed with a peripheral groove 12' engaged by a complementarily profiled flange 14' of a retaining element 14. The retaining element, again provided with an undercut 14" on the entrance side of the annular gap between the rings, embraces the associated bearing ball 13 along an arc greater than 180°.

Figure 5:
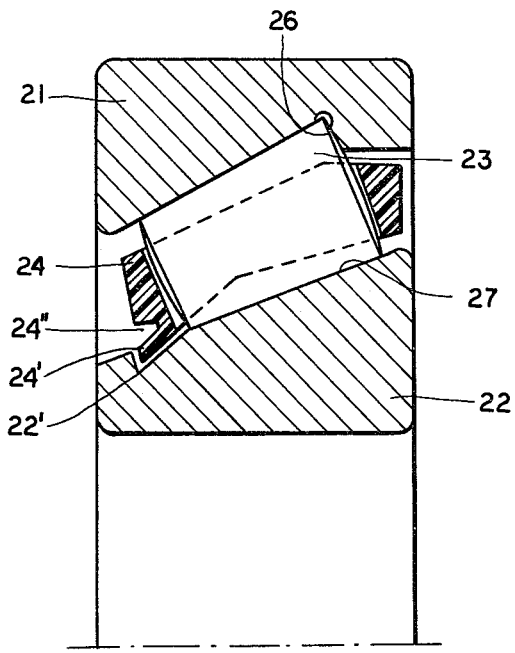
FIG. 5 is another view similar to FIG. 1, showing a combined journal and thrust bearing according to our invention with frustoconical rollers.

In FIG. 5 we have shown an outer ring 21, formed with a lateral shoulder 26 on its track surface, and an inner ring 22 whose track surface 27 converges laterally toward the confronting track surface of ring 21. Frustoconical rollers 23 separate the two track surfaces, at least one such roller being embraced by a retaining element 24 with a flange 24' and an undercut 24" as previously described. Flange 24' is snapped into a peripheral V-groove 22' of surface 27. The unit is assembled, in this instance, by sliding the outer ring 21 with its rollers 23 onto the inner ring 22 from the left until flange 24' snaps into the groove 22'.

Figure 6:
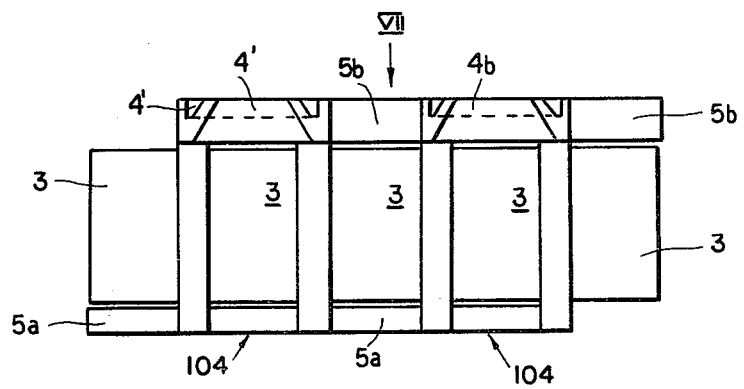
FIG. 6 is a developed view of part of a roller-bearing unit according to our invention with a multiplicity of retaining elements.
Figure 7:
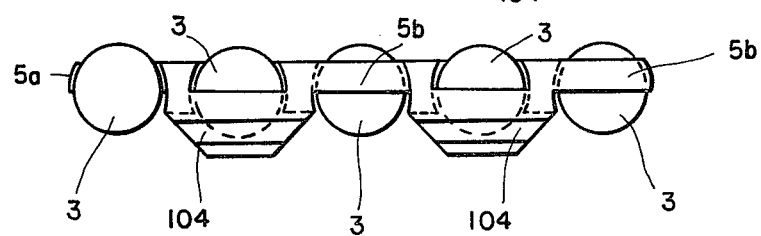
FIG. 7 is a view of the assembly of FIG. 6 as seen in the direction of arrow VII.

In FIGS. 6 and 7 we have illustrated part of a bearing unit in which every other rotary body 3 (here shown as cylindrical rollers as in FIGS. 1 and 2) is individually embraced by a retaining element 104. Each of these retaining elements is here shown provided with two extensions 5a, 5b contacting adjoining retaining elements, the intervening roller 3 being thus bracketed between two such elements 104 and the extensions 5a, 5b thereof. It will be noted that extensions 5a and 5b lie on opposite sides of the array of rollers 3; these extensions, whose length substantially equals the roller diameter, are rounded at their free ends with a curvature conforming to that of the rollers and of the roller-contacting flanks (8, FIGS. 2 and 3) of their neighbors. The bracketed rollers have a certain axial play designed to prevent jamming.

Extensions 5a and 5b could also be of a length sufficient to embrace two or more intervening rollers. Obviously, the same kind of arrangement can be used with rotary bodies designed as balls.

We claim:

1. A bearing unit comprising:
   a pair of coaxial rings forming respective track surfaces separated by an annular gap;
   a multiplicity of rotary bodies disposed in an annular array in said gap, one of said track surfaces being formed with an annular lodgment defining a fixed relative axial position of said bodies, the other of said track surfaces being unobstructed on at least one side of said array to facilitate the initial assembly of the unit; and
   holding means including a plurality of substantially identical, mutually unconnected retaining elements each embracing a single one of said bodies, said retaining elements being each provided with integral extensions holding same spaced apart with a separation accommodating at least one intervening rotary body, said other of said track surfaces and said retaining elements being provided with interfitting formations whereby said rings are held in a substantially fixed relative axial position.

2. A bearing unit as defined in claim 1 wherein adjoining retaining elements are provided with axially spaced-apart extensions bracketing the intervening rotary body.

3. A bearing unit as defined in claim 2 wherein each retaining element has a pair of said axially spaced extensions projecting in opposite peripheral directions therefrom.

4. A bearing unit as defined in claim 3 wherein the oppositely projecting extensions of each retaining element abut two neighboring retaining elements.

5. A bearing unit comprising:
   a pair of coaxial rings forming respective track surfaces separated by an annular gap;
   a multiplicity of rotary bodies disposed in an annular array in said gap, one of said track surfaces being formed with an annular lodgment defining a fixed relative axial position of said bodies, the other of said track surfaces being unobstructed on at least one side of said array to facilitate the initial assembly of the unit; and
   holding means including at least one retaining element individually embracing a single one of said bodies, said other of said track surfaces and said retaining element being provided with interfitting formations whereby said rings are held in a substantially fixed relative axial position, a plurality of said rotary bodies other than the body embraced by said retaining element being in direct contact with one another.

6. A bearing unit as defined in claim 5 wherein said formations are an annular V-groove in said other of said track surfaces and a flange of substantially complementary profile on said retaining element snap-fitted into said V-groove.

7. A bearing unit as defined in claim 6 wherein said flange is provided with an undercut enhancing its radial compressibility to facilitate its introduction into said V-groove.

8. A bearing unit as defined in claim 5 wherein each retaining element has curved outer flanks conforming to the shape of adjoining rotary bodies in contact therewith.

* * * * *